Sept. 1, 1925.
J. A. DYSON
LAWN EDGER
Filed July 17, 1922
1,551,647
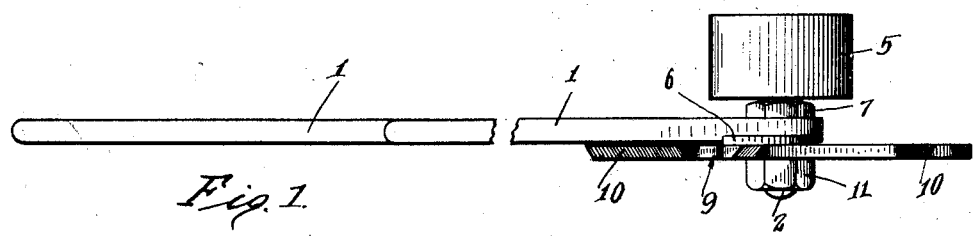
Fig. 1.
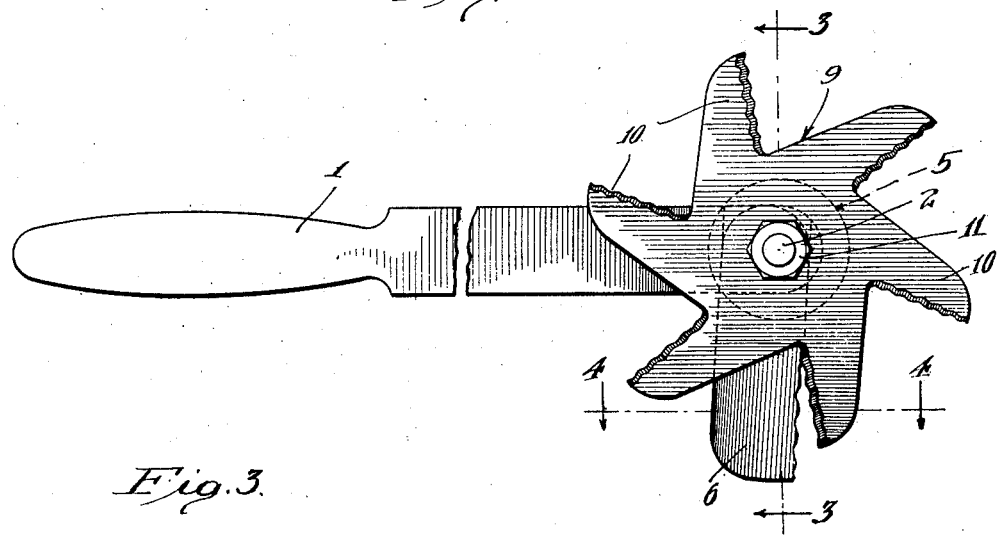
Fig. 2.
Fig. 3.
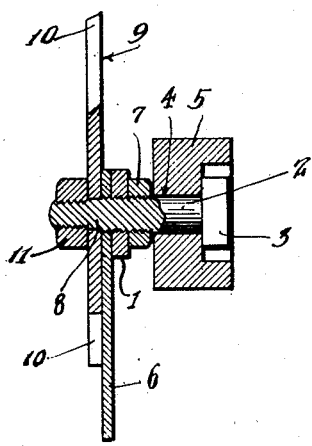
Fig. 4.
Inventor
John A Dyson
By Lyon & Lyon attys.

Patented Sept. 1, 1925.

1,551,647

UNITED STATES PATENT OFFICE.

JOHN A. DYSON, OF LOS ANGELES, CALIFORNIA.

LAWN EDGER.

Application filed July 17, 1922. Serial No. 575,690.

*To all whom it may concern:*

Be it known that I, JOHN A. DYSON, a citizen of the United States, residing at Los Angeles, in the county of Los Angeles and State of California, have invented a new and useful Lawn Edger, of which the following is a specification.

The object of this invention is to provide a device suitable for trimming or cutting the grass at the edge of a lawn whereby a neat and shapely cut edge may be produced.

I have found that it is necessary for the complete and best trimming of these edges to provide a shearing action wherein the grass is caught between two coacting blades and thereby completely sheared or cut. Simple shearers or clippers are not entirely satisfactory for this purpose since they are not sufficiently rapid of operation and tend to produce irregularities in the edge of the lawn. By my invention the disadvantages of these previous devices have been overcome and a remarkably simple and economical lawn edger provided.

For the best construction of such a device I have found it desirable to provide, first, a stationary blade which may be guided along and define the edge of the lawn, second, to have a number of coacting blades which catch the grass along the edge defined by the stationary blade and by a shearing action of these coacting blades against the stationary blade trim the edge along the defined line. Preferably both the stationary blade and the coacting blades should be serrated to better catch and cut the grass. Third, it is desirable to combine with these elements a guiding or supporting means for the operaton of the edger.

A lawn edger must necessarily be simple in construction compact and adaptable to trimming or following various curves of the edge of the lawn and for these reasons coacting blades cannot be operated by power but should properly be operated by a forward motion of the device.

With the foregoing preliminary explanation, my invention will be more readily understood from the following drawings illustrating the preferred embodiment:

Figure 1 is a plan view of a lawn edger constructed in accordance with my invention.

Fig. 2 is a horizontal elevation of Fig. 1.

Fig. 3 is a sectional view taken along the line 3—3 of Fig. 2.

Fig. 4 is an edge view of the coacting blades taken along the line 4—4, Fig. 2.

As shown in the drawings illustrating the preferred embodiment of my invention, the lawn edger consists of a handle 1 which is threaded at one of its ends onto a stud 2. The stud 2 is provided with a head 3 and a cylindrical portion 4 providing a bearing for a supporting roller 5 which is recessed to fit over the head 3. A stationary blade 6 is threaded onto the stud 2 and countersunk into one side of the handle 1 which is properly recessed to maintain the stationary blade at an angle of approximately 90°. The nut 7 secures the handle 1 and stationary blade 6 on the stud 2. The stationary blade 6 has a cutting edge which is preferably serrated as shown in Figure 2. The stud 2 contains a second cylindrical portion 8 which provides a bearing for a circular cutter 9. Said cutter 9 is notched or shaped to provide a plurality of blades 10 having serrated knife edges as shown in Fig. 2, said edges being adapted to coact with the stationary blade 6. A nut 11 is threaded on the stud 2 providing a guide for a circular cutter 9.

In use the device is controlled by the hand of the operator engaging the handle 1. The device is then brought into such position that the rotating cutter 9 is between the stationary blade 6 and the edge of the lawn. The circular cutter 9 and stationary blade 6 are then brought as flush as possible with the edge of the lawn and the device moved forward so as to sever the grass at the lawn's edge. The contact of the cutter 9 with the grass and soil at the edge of the lawn is sufficient to rotate the cutter 9, the blades 10 of the cutter coacting with the stationary blade 6 to shear or cut the grass. The plane through which the stationary blade 6 is passed defines the edge of the lawn. The roller 5 partially supports the device usually by rolling along a sidewalk or like adjacent the lawn.

It can be seen that this device provides a simple and economical arrangement of shearing blades for cutting and trimming the lawn and by this arrangement a better and neater cut edge will be produced.

While the foregoing described device is well suited for the purposes of my invention, my invention is not limited to the specific embodiment shown but is of the scope set forth in the following claims.

I claim:

1. In a lawn edger adapted to trim a lawn during a forward motion of the edger comprising an operating handle, provided with a recess in one end thereof, a stationary cutting blade secured to the said handle in the recess so as to maintain the blade fixed in relation thereto, a pin screw threaded into the said handle and blade, a supporting roller journaled on said pin, means for locking the pin to the handle and blade in a position spaced from the said roller, and a rotary cutter journaled on the pin adjacent the said cutter.

2. In a lawn edger comprising an operating handle provided with a recess, a stationary cutting blade fitted into the recess formed in the handle, a pin screw threaded into the handle and blade, said blade having a serrated edge, a supporting roller journaled on the said pin, a rotary cutter journaled on the said pin adjacent the said fixed cutter, said rotary cutter having a serrated edge complementary to the serrated edge of the fixed cutter.

Signed at Los Angeles, California, July, 1922.

JOHN A. DYSON.